United States Patent [19]

Rinaldi

[11] 4,157,667
[45] Jun. 12, 1979

[54] VARIABLE RATIO DRIVE FOR GEARING ROTATING PARTS TO ONE ANOTHER UTILIZABLE FOR CYCLES, MOTORCYCLES, MOTOR VEHICLES AND MACHINES IN GENERAL

[76] Inventor: Giovanna Rinaldi, Via Gozzano 40, San Terenzo (La Spezia), Italy

[21] Appl. No.: 834,310

[22] Filed: Sep. 19, 1977

[30] Foreign Application Priority Data

Oct. 4, 1976 [IT] Italy ............................. 27978 A/76
Oct. 4, 1976 [IT] Italy ............................. 27979 A/76
Dec. 31, 1976 [IT] Italy ............................. 31068 A/76
Feb. 8, 1977 [IT] Italy ............................. 20042 A/77

[51] Int. Cl.² ............................................. F16H 3/44
[52] U.S. Cl. .............................. 74/750 B; 74/781 B
[58] Field of Search ............. 74/750 B, 781 B, 750 R; 280/260, 238

[56] References Cited

U.S. PATENT DOCUMENTS

| 594,567 | 11/1897 | Seelye | 74/781 B |
|---|---|---|---|
| 854,599 | 5/1907 | Pedersen | 74/347 X |
| 931,656 | 8/1909 | Sangster | 74/781 B |
| 2,494,558 | 1/1950 | Irwin | 74/750 B |
| 2,609,712 | 9/1952 | Hood | 74/781 B |
| 2,731,857 | 1/1956 | Marino | 74/781 B |
| 3,727,484 | 4/1973 | Shea et al. | 74/750 B X |
| 3,828,627 | 8/1974 | Schwerdhofer | 74/750 B |
| 3,886,811 | 6/1975 | Hillyer | 74/750 B |
| 3,973,451 | 8/1976 | Kine | 74/750 B |

*Primary Examiner*—Samuel Scott
*Assistant Examiner*—Randall L. Green
*Attorney, Agent, or Firm*—Cushman, Darby & Cushman

[57] ABSTRACT

Disclosed herein is a new variable ratio drive which can be utilized for cycles, scooters, motorcycles, motor vehicles and any type of machine in general on which it is necessary to transmit motion with a multiplicative and/or a reducing ratio, with or without inversion of motion, from one to the other of two, coaxial or otherwise, rotating parts.

13 Claims, 11 Drawing Figures

VARIABLE RATIO DRIVE FOR GEARING ROTATING PARTS TO ONE ANOTHER UTILIZABLE FOR CYCLES, MOTORCYCLES, MOTOR VEHICLES AND MACHINES IN GENERAL

BACKGROUND OF THE INVENTION

This invention relates to a new variable ratio drive which can be utilized for cycles, scooters, motorcycles, motor vehicles and any type of machine in general on which it is necessary to transmit motion with a multiplicative and/or a reducing ratio, with or without inversion of motion, from one to the other of two, coaxial or otherwise, rotating parts.

DESCRIPTION OF THE PRIOR ART

It is customary for drive systems with a speed ratio that is also variable between two non coaxial rotating parts, such as, for example, between the pedal shaft and the hub of the rear drive wheel of a bicycle, the crankshaft and the camshaft of the engine of a motor vehicle, and the driving shaft and the basket shaft in a washing machine etcetera, to be designed. Depending upon the requirements and their suitability, belt or chain means of transmission can be used, or else a geared coupling can be provided.

Far less usual, despite the fact that in certain cases their suitability is certain, are instead drive systems with a variable ratio between rotating parts positioned on coincident axes. Up until now it has, in fact, been problematical to create this type of drive and, in particular, to achieve the required gear ratio using simple, compact devices that occupy little space yet, at the same time, operate impeccably with minimum friction, as is to be hoped for, especially in view of the possible applications on all machines where problems of weight and overall dimensions are particularly felt.

SUMMARY OF THE INVENTION

The general object of the present invention is to create a variable ratio drive between rotating parts, even when positioned coaxially, which has outstanding advantages of a simplicity, compactness, overall dimension and functional nature.

Another object of the present invention is to create a drive of the aforementioned type which is perfectly utilizable on machines of various types and particularly on cycles, motorscooters and motorcycles.

Compatibly with the foregoing objects, the variable ratio drive according to the present invention is characterized by the fact that it comprises: an internally cogged bell shaped drive member that is carried in axial rotation by the rotating drive unit; a plurality of kinematic gear chains that engage with the teeth in the inside of the said drive member and are placed parallel to one another transversely to the axis of rotation of the said drive member in such a way as to convert the rotary motion of the latter into variable ratio motion at various speeds of the corresponding gearwheels arranged coaxially to the inside of the said drive member; a driven member that is able to rotate around the axis of the said gearwheels and the said drive member coupled for rotation to the rotating driven unit; and controllable means for selectively coupling the said driven member to one or the other of the said gearwheels to suit the desired gear ratio. For the reduction function, instead, the rotating drive unit transmits the drive, via one or the other of the said gearwheels and a corresponding kinematic chain, to a crown gear inside the driven member and coupled for rotation to the rotating driven unit in such a way as to gear down the original rotary motion into rotary motion at various speeds. In the text that follows hereafter, as also in the drawings, only the multiplicative function will be described since this is the one that is the most complex. Insofar as the reduction function is concerned, the information given briefly at the end of the text should suffice.

This particular drive, with its change of ratios, differs substantially in its kinematics from all the epicyclic and planetary gears known to date since it is the first to have a plurality of side pinions on one single spider.

There are many advantages that can be attributed to the drive according to the invention, as outlined above, and among those that are of the most importance the following can be listed:

(a) Directly coupled main gears and the consequential elimination of chains, drive belts and all other intermediate gears, as also discontinuities in the drive shafts, thereby avoiding losses of power caused by intermediate gear friction and by weaknesses resulting from the said lack of continuity.

(b) The extreme simplicity and compactness of the drive, as well as its reduced overall dimensions and weight.

(c) The absence of theoretical limits in the gearing up and gearing down functions, irrespectively of the direction of rotation, and thus the possibility of having in each case, for example, high gear ratios and thus a saving of energy; also the excellent automatic distribution of the load onto the various component parts and, in particular, onto the teeth of the gears.

(d) The absence of theoretical limits in the number of gear ratios, due both to the constructional criterion and to the extremely reduced overall dimensions of the drive, which is what also ensures the best possible ratio continuity.

(e) The flywheel effect that is automatically ensured by the drive member, the driven member and the centre wheels, which can eventually be increased through the addition of one or more supplementary flywheels.

(f) The excellent protection and lubrication possibilities kinematic gear chains are offered because of their being in an easily closed bell shaped member.

These advantages render the drive according to the invention particularly suitable for use as a speed changing device on a new type of bicycle which is characterized by the arrangement of the pedal shaft (which constitutes in this particular case the rotating drive unit) coaxially with the hub of the rear drive wheel (which constitutes in this particular case the rotating driven unit). As will become more obvious later on from a simplified description of an example of a form of embodiment for this bicycle, with the said use of the drive according to the invention it is, in fact, possible to add to the previously listed advantages also those pertaining to overcoming problems inevitably connected with the present use of a drive chain, such as its considerable friction which reduces efficiency, and the fact the chain dirties and is liable to get caught, to snap or to come off. Furthermore, it also provides the possibility of placing the complete drive unit in the best possible position for its own stability, that of the cyclist-bicycle, and for aligning the line of action or force with respect to the median plane of the wheel to which it is connected, as well as for the energy expended-performance of the cyclist.

In harmony with the invention, a drive particularly suitable to be used for speed changing purposes on a bicycle of the aforementioned type preferably comprises, as the means for selectively coupling the driven member to one or the other of the gearwheels placed on the outside of the kinematic gear chains, a clutch device shaped in the form of a cage, this being positioned coaxially to the inside of the said gearwheels in rotation engagement with the said driven member and axially displaceable with respect to the said gearwheels so as to selectively engage one of its external gears with a corresponding internal gear in one or the other of the said gearwheels.

This, as can be seen, is an extremely simple yet efficient selective coupling means which makes meshing faster and easier when changing ratios by passing from an idle position (during which all the gears continue to rotate through inertia and thus have a rotation speed very close to that of the clutch device which is also carried at the same inertia speed as the rotating driven unit, for example the drive wheel of a bicycle).

The foregoing is applicable when the drive according to the invention is employed as a means of changing speeds on a bicycle or in some other machine where the number of revolutions is low. In the case, instead, of machines where the number of revolutions is high, such as, for example, motorcycles or motor vehicles, then the problem of synchronization also has to be solved.

In harmony with the invention, a drive particularly suitable to be used for speed changing purposes in a machine with a high number of revolutions differs from the preceding description pertinent to a bicycle or to some other machine with a low number of revolutions on account of the fact that the bell shaped drive member is coupled to the rotating drive unit through a friction clutch that can be disengaged and that each gearwheel has its internal gear laterally provided with at least one coaxial annular border of friction material with which the external gear of the cage shaped clutch device is destined to establish a friction contact prior to engaging with the internal gear in the gearwheel at the time the ratio is being changed.

On high revolution machines, this change of speed is based on the fact that the displacement of the cage shaped clutch device obliges the external teeth of this to establish, at the time of the change of ratios, friction contact with the nearby lateral border of the gearwheel to be engaged, and this tends to progressively give rise to a substantially identical angular velocity between the coupling device (rotatable together with the driven member and thus with the wheels of the motorcycle or the other driven machine) and the said gearwheel (opportunely put into neutral through the disengagement of the friction clutch between the drive unit and the bell shaped drive member). The sunstantial synchronism that allows the external teeth of the clutch device to continue their travel until they are inserted into the corresponding internal slots in the gearwheel is thus achieved. To render the said operation easier, the teeth and the slots can have their edges suitably rounded off.

In this way the variable ratio drive described above retains unchanged all the fundamental advantages of the present invention, particularly as regards a wide choice of ratios and limited overall dimensions and, at the same time adds thereto first class synchronization possibilities that make possible the use thereof in high speed machines.

Still in harmony with the invention, a further speed changing version utilizable on machines of any kind, particularly motorcycles and motor vehicles, is envisaged, wherein the selective coupling of the driven member with the various gearwheels in order to change ratios is achieved electromagnetically and, therefore, in a simpler and faster way and each time with the utmost freedom in selecting the ratio to be engaged.

This particular version of the drive according to the invention preferably comprises, to be more precise, selective coupling means constituted by a plurality of successions, arranged circumferentially, of coupling members carried by the said driven member which are caused electromagnetically, in selective fashion, to move between a non-operative and an operative position in which they engage with a given gearwheel in order to pass the rotary motion of this onto the said driven member.

With this latter speed changing version according to the invention, the operation of changing ratios thus consists simply in actuating electromagnetically (and therefore by merely pressing, for example, an operating pushbutton) the movement into their operative position of the succession of the coupling members (preferably consisting of circular segments either made of friction material or else faced with friction material) envisaged for coupling (preferably by friction) the corresponding gearwheel at the desired ratio. Such a coupling is, therefore, realizable with the utmost rapidity, with minimum displacements (to the full advantage of the robustness of the operation) and with the freest possible choice of ratios, that is to say, without any need to have to pass through eventual intermediate ratios. Also the possibility is not to be excluded, in consideration of the friction coupling of circular engagement segments to the gearwheels, of going directly from a forward motion gear to a reverse motion gear, or vice versa, for example, in cases of emergency.

It should also be noted that the particular way in which the change of ratios is achieved renders unnecessary the use of a clutch for temporarily disengaging the drive shaft from the drive member, which is obviously to the full advantage of constructional and functional simplicity, thanks to which any risk has, furthermore, been totally overcome of meshing not taking place when rapid changes of ratio are made, whilst the operation of "going through the gearbox" in order to obtain rapid decelerations of the means with the engine is aided in full.

BRIEF DESCRIPTION OF THE DRAWINGS

The characteristics and advantages of the present invention will be better understood from the following detailed description of certain forms of embodiment for it shown as unlimited examples on the accompanying drawings in which.

It should be noted that for reasons of clarity systems for reducing friction, such as radial bearings, axial thrust bearings and axial cage bearings are neither described nor illustrated herein. This also applies to airtight and dustproof systems.

DESCRIPTION OF THE PREFERRED EMBODIMENT

Figure 2:
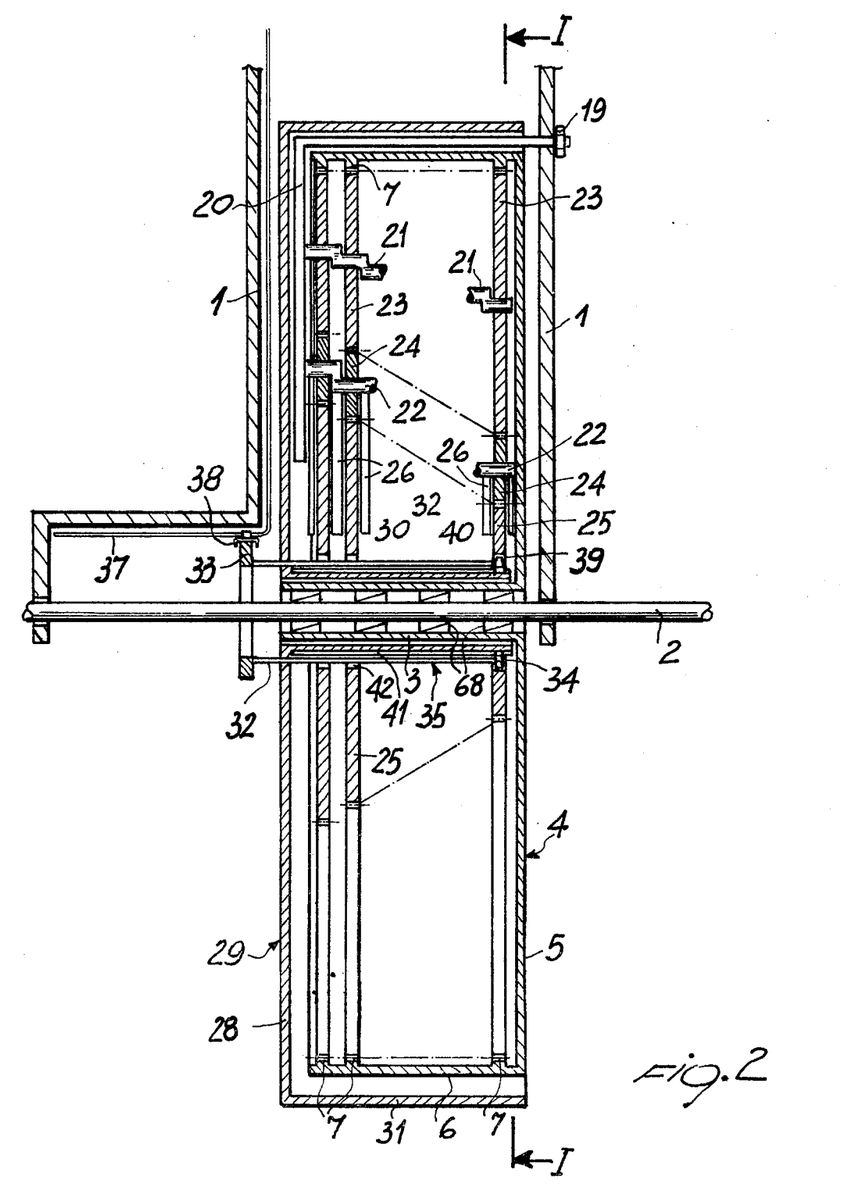
FIG. 2 shows the said drive in sectional form axially along the line II—II in FIG. 1.
Figure 3:
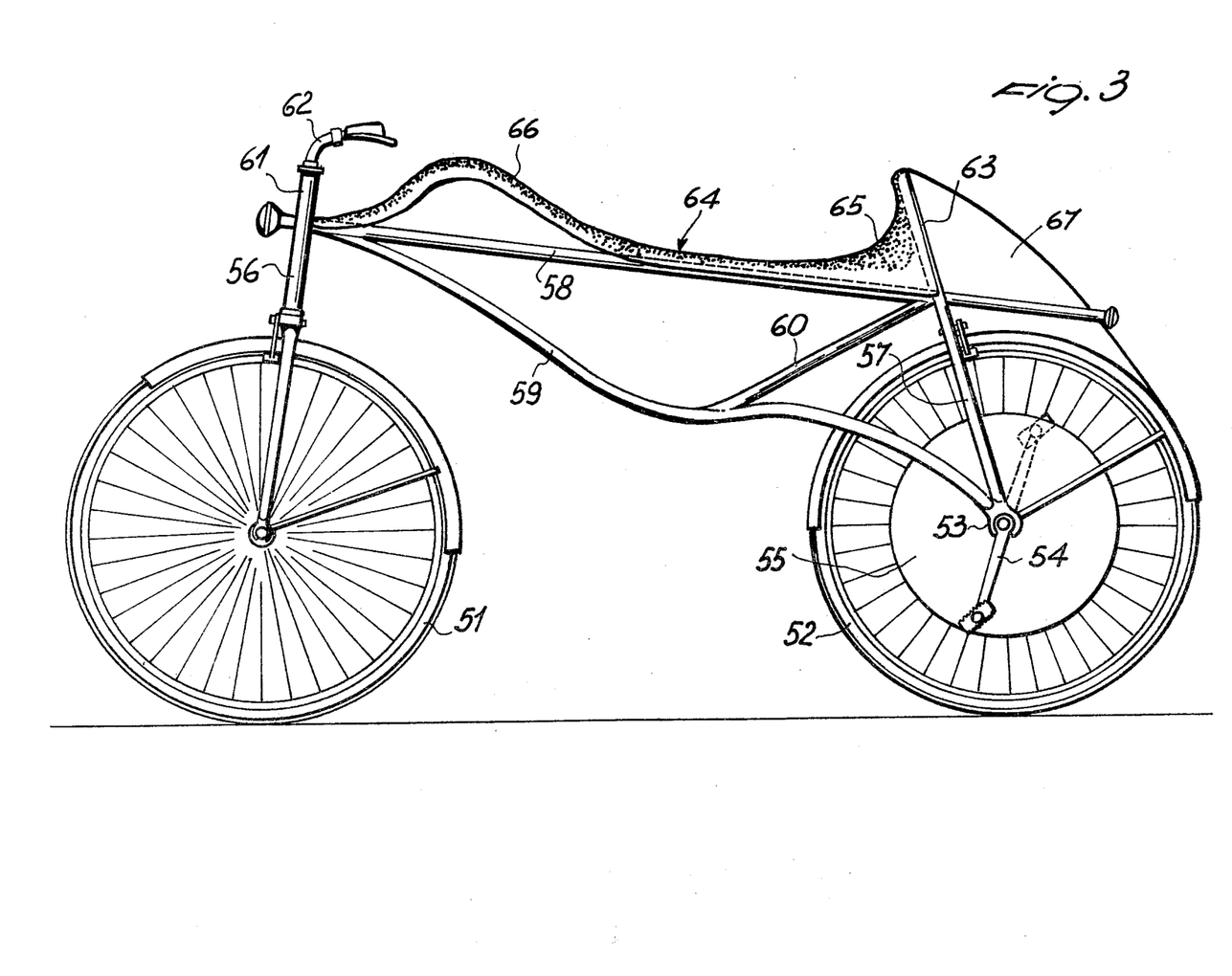
FIG. 3 shows diagrammatically a bicycle of the above mentioned type.
Figure 4:
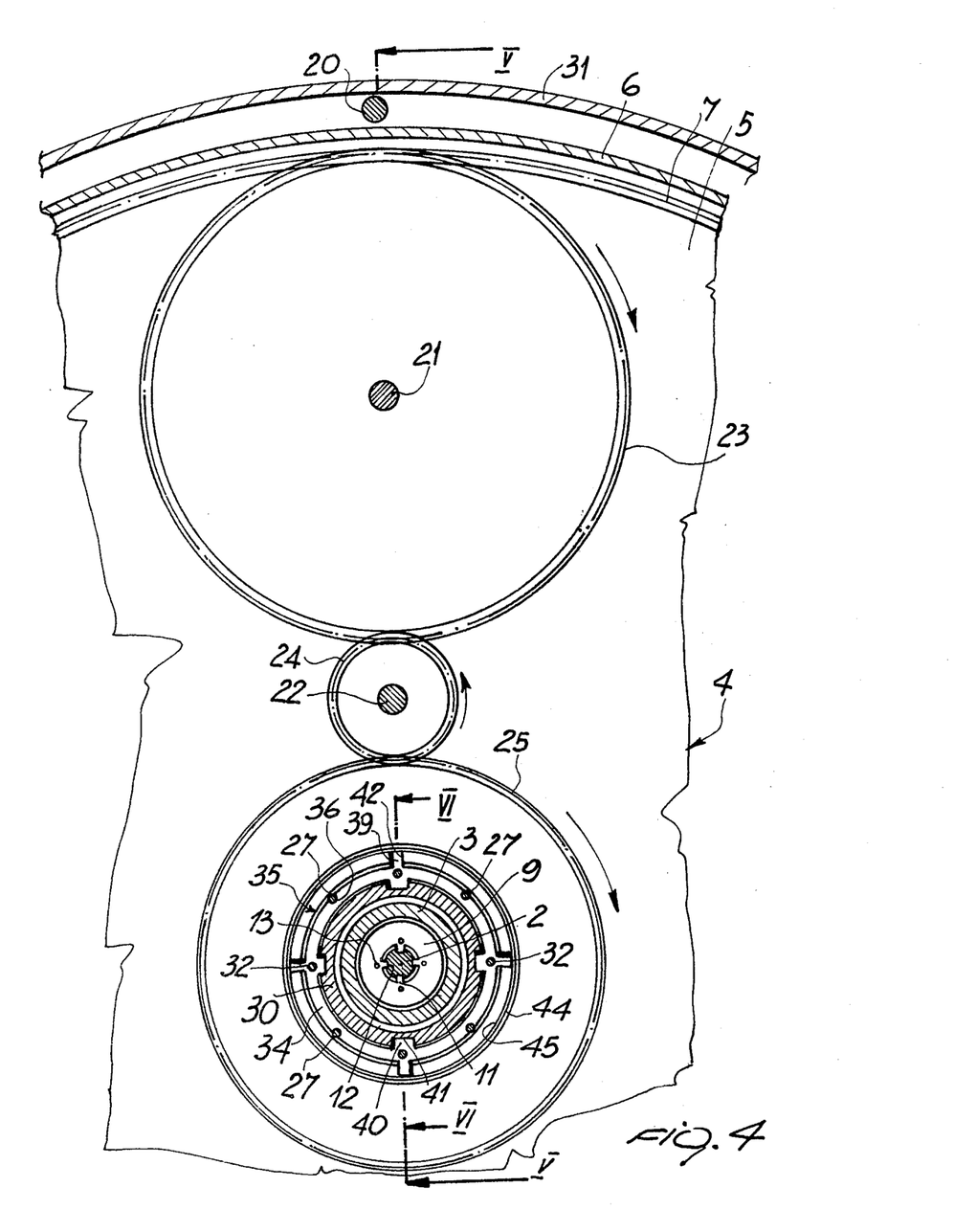
FIG. 4 shows in cross section, along the line IV—IV in FIGS. 5 and 6, a second form of embodiment for the drive according to the invention, utilizable for speed changing purposes in high revolution machines, such as, for example, motorcycles and motor vehicles.

As is possible to see from FIG. 2, a fixed structure 1 which can be, for example, the rear fork of a bicycle, pivotally supports a drive shaft 2 that constitutes the rotating drive unit and which in a bicycle such as the one depicted in FIG. 3 can be operated directly by means of pedal cranks positioned in the centre of the hub of the rear drive wheel which, in turn, constitutes the rotating driven unit.

Coaxially to the drive shaft 2 (FIGS. 1 and 2), kinematically connected thereto by means of unidirectional freewheel couplings 68, there is a central tubular part 3 of a bell shaped member 4 which is also provided with a base part 5 and an external cylindrical part 6 which has internal peripheral teeth 7.

As shown in FIG. 2, the fixed structure 1 has secured to it through a nut 19, an L shaped rod 20 that extends with a first side above the cylindrical part 6 of the bell shaped member 4, and with the second side partially infront of the mouth of this. The said second side of the rod 20 has fastened to it a first stepped bar 21 and a second stepped bar 22 which extend in overhanging fashion inside the space between the two coaxial parts 3 and 6 of the bell shaped member 4. Depending upon the preference of the manufacturer the overhang can be directed downwards, as in FIG. 2, or else upwards, or as in a variant form of embodiment described herein, the bars 21 and 22 can be straight and the wheels 24 (described below) can be of various diameters.

Supported on the steps of the first bar 21, a plurality of gearwheels 23 of various diameters idle pivotally. Each wheel 23 meshes with one of the teeth 7 of the external cylindrical part 6 of the bell shaped member 4, as well as with a given one of a plurality of gearwheels 24 supported on the steps of the bar 22 to idle pivotally (FIGS. 1 and 2).

Figure 1:
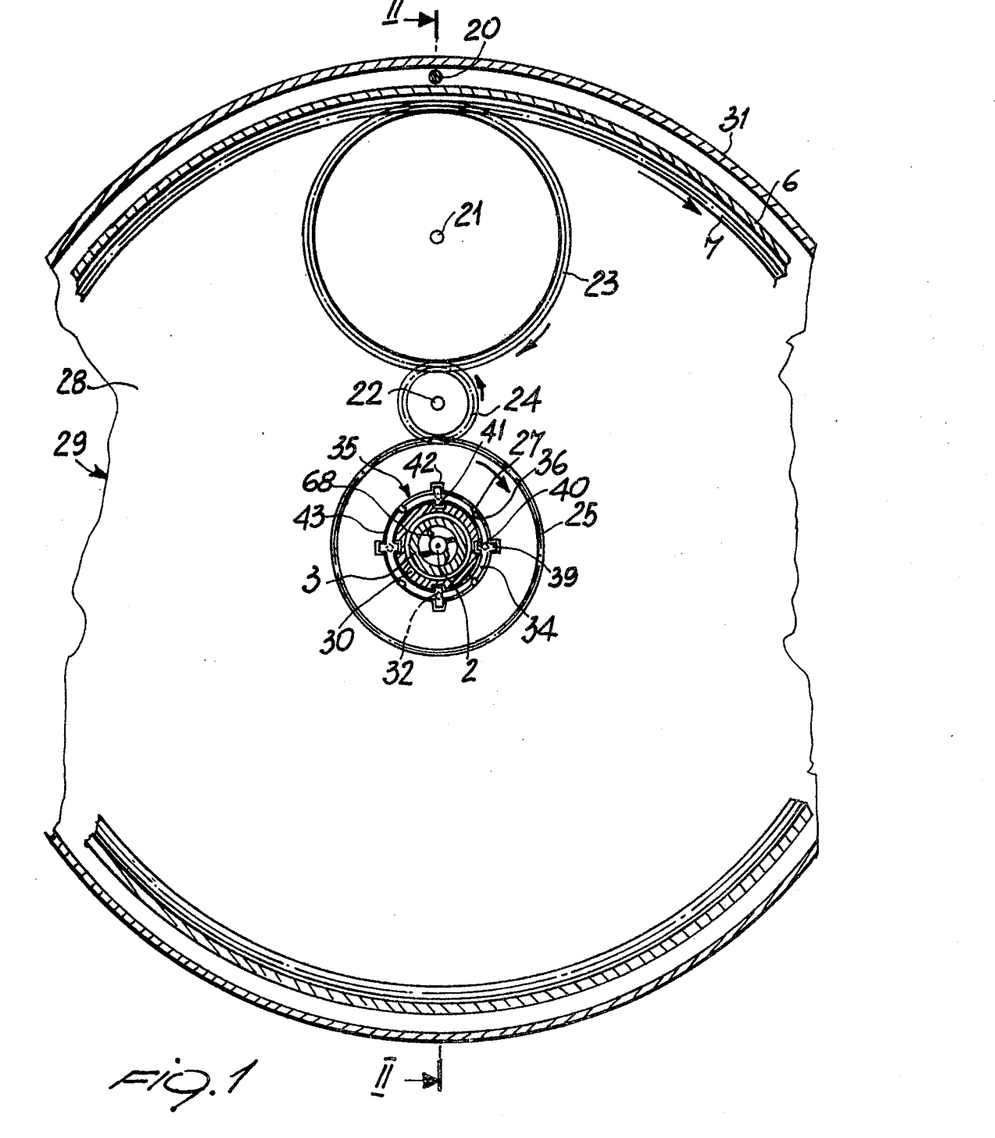
FIG. 1 shows in cross section, along the line I—I in FIG. 2, a first form of embodiment for the variable ratio drive according to the invention, destined in particular for use as a speed changing device on a bicycle with pedals keyed to the hub of the drive wheel.

Each of the wheels 24 meshes, furthermore, with a given one of a plurality of gearwheels 25 arranged coaxially around the drive shaft 2 and the central tubular part 3 of the bell shaped member 4, these being supported to idle, between the positioning guides 26 fixed to the bar 22 (FIG. 2), on a plurality of spindles 27 spaced circumferentially (FIG. 1) that are preferably free to rotate around their own axes and are secured to the base part 28 (FIG. 2) of a further bell shaped member 29 which acts as the driven member of the variable ratio drive shown in FIGS. 1 and 2. All the toothing mentioned should preferably be helical.

As shown in FIG. 2, the base part 28 of the bell shaped member 29 virtually seals the mouth of the bell shaped member 4 and, furthermore, it comprises a central tubular part 30 arranged coaxially so that it is free to pivot around the central tubular part 3 of the bell shaped member 4, as well as an external cylindrical part 31 placed coaxially around the external cylindrical part 6 of the bell shaped member 4 and above the L shaped rod 20. The said cylindrical part 31, in actual fact only provided for certain types of applications, is preferably destined to act directly as a support for a rotating driven unit, which can, for example, be constituted by the hub of the rear drive wheel of a bicycle such as the one illustrated in FIG. 3 and described hereinafter. In its absence and for other uses (motor vehicles, for example) the same function can be carried out by the base part 28 of the bell shaped member 29.

Among the spindles 27, on which the gearwheels 25 are able to rotate freely, a similar plurality of rods 32 (FIGS. 1 and 2) are intercalated and these slide through corresponding holes in the base part 28 of the bell shaped member 29 and are rigidly connected at their extremities to an external ring 33 and to an internal ring 34 in such a way as to form a tubular cage shaped sliding body 35 that serves as the coupling device for selectively coupling the tubular part 30 of the bell shaped member 29 to one or the other of the various gearwheels 25. As shown in FIG. 1, the said internal ring 34 of the cage shaped body 35 has small radial notches 36 corresponding to the spindles 27 in such a way that the said cage shaped body 35 is able to slide freely in a longitudinal direction.

The sliding motion of the cage shaped body 35 is controlled through a cable 37 that ends at a forked slide 38 rotatably engaged with the external ring 33 of the cage shaped body 35 (FIG. 2). Details pertaining to the fixing, guiding and returning of the cable 37 are neither described nor illustrated herein since the methods used are of a known type, the fundamentals of which are outside the framework of the present invention.

As clearly shown in FIGS. 1 and 2, the internal ring 34 of the cage shaped body 35 is provided with external teeth 39 and with a ring of internal teeth 40. The latter slide in engagement in the longitudinal slots 41 in the central tubular part 30 of the bell shaped member 29, whilst the former are cut to mesh selectively with the corresponding slots 42 in the internal cylindrical surface 43 (FIG. 1) of each gearwheel 25. In this way only one of the gearwheels 25 can be selectively coupled to the internal ring 34, and thus to the coupling device 35, whilst the others are free to idly rotate above the spindles 27.

By virtue of the structure described above, the variable ratio or speed changing drive shown in FIGS. 1 and 2 is able to operate in the following way. Normally the rotary motion of the drive shaft 2 that constitutes the kinematic motion drive unit is transmitted via the free wheels 68 to the bell shaped drive member 4 which, through the internal toothing 7 and the idle wheels 23 and 24, maintains the various gearwheels 25 in rotation at various speeds, respectively. The particular gearwheel 25 (the first on the right in FIG. 2) that has the external teeth 39 of the coupling device 35 inserted in its own slots 42 transmits, in turn, the motion to the said coupling device and thence, through the internal teeth 40 of the latter, to the bell shaped driven member 29 which carries the rotating driven unit (for example, the rear drive wheel of a bicycle) in rotation.

When it is wished to effect a change of ratio, the control cable 37 is operated so as to displace the cage shaped body 35 towards a condition whereby its external teeth 39 engage with the slots 42 in a new gearwheel 25. Suitable profiles of the said teeth and the said slots can be used to facilitate the engagement during ratio variations. When fitted to a bicycle, pedalling can, furthermore, reduce the differences in speed between the coupling device 35 (which during its neutral condition is made to rotate through inertia by the drive wheel of the bicycle) and the gearwheel 25 to be engaged (dependent on the pedals of the bicycle), so as to also facilitate in this way the new ratio being engaged. It should be noted that, since the bell shaped drive member 4 and the gear chains 23, 24 and 25 continue rotating even during the periods when the gear change is in neutral, an automatic action is constantly achieved through the flywheel effect which exercises a considerably beneficial effect on the ratio output performance. Eventually, the said flywheel effect can be increased by adding shims or inertia masses.

Simply by way of an example, a type of bicycle is shown in FIG. 3 to which the speed change device shown in FIGS. 1 and 2 could be destined in particular. The said bicycle comprises a front wheel 51 and a rear drive wheel 52, the hub 53 of which is provided with a speed change device 55 as shown in FIGS. 1 and 2 and has directly keyed to it the pedal cranks 54 (to be more precise these are rigidly secured to what in FIGS. 1 and 2 has been indicated as the drive shaft 2). The said wheels 51 and 52 are interconnected by a frame formed by two forks 56 and 57 (the latter corresponding to the fixed structure 1 in FIG. 2), by a crossbar 58 and by two additional connecting members 59 and 60. An upper extension piece 61 on the front fork 56 carries rotatably a handle bar 62, whilst a forward sloping upper extension piece 63 on the rear fork 57 locates the back extremity of a saddle 64 that extends along the crossbar 58 and has an ample connecting curve 65 at the rear and an arcuate rise 66 at the front. The rear curve 65 constitutes the part of the saddle on which to sit, whilst the arcuate rise 66 serves for the cyclist to rest his chest on. It is, in fact, envisaged that the cyclist can pedal more comfortably semi-stretched out on the saddle 64 in a notably streamlined position, his legs operating the pedal cranks 54 and thus driving the rear wheel 52. Behind the saddle 64 a casing 67 can easily be arranged to act as a luggage carrier.

With the bicycle shown in FIG. 3, it is envisaged that the cyclist is able to pedal in a much less fatiguing and much more stable condition than is customary at present, since his spine is parallel to and almost coincident with the ideal handle bar-rear wheel hub ensemble, whilst centre of gravity wise he is less far away from the ground. In this position, moreover, he will be better able to make full use of his physical power to turn the pedals and thus to further raise the efficiency of the machine, already increased because of the elimination of the considerable losses caused by the gear chain which here is no longer present.

Whilst the variable ratio drive shown in FIGS. 1 and 2 is to be considered particularly suitable for use as a speed changing device for bicycles or other low revolution machines, that shown in FIGS. 4–7 is certainly better suited for employment in high revolution machines, such as motorcycles and motor vehicles in general, since it is provided with additional friction means for disengaging the drive, as well as with means with which to achieve, at the time of the change of ratios, synchronization of speed between the coupling means and the gearwheel to be engaged.

Figures 5, 7:
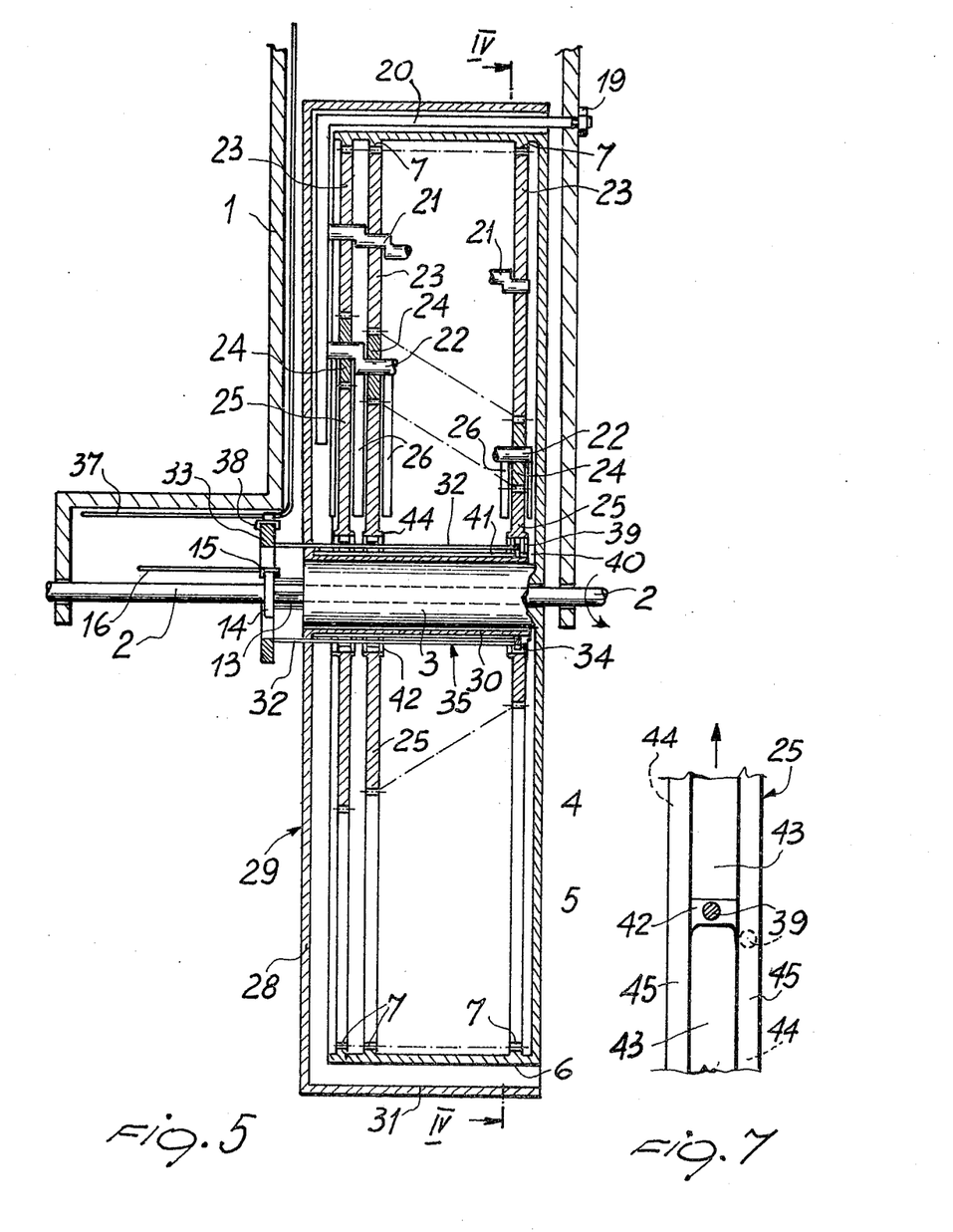
FIG. 5 shows the said drive in part sectional form along the line V—V in FIG. 4.
FIG. 7 shows the extension on the flat of a part of the internal cylindrical surface of one of the gearwheels of the drive depicted in FIGS. 4 and 5.
Figure 6:
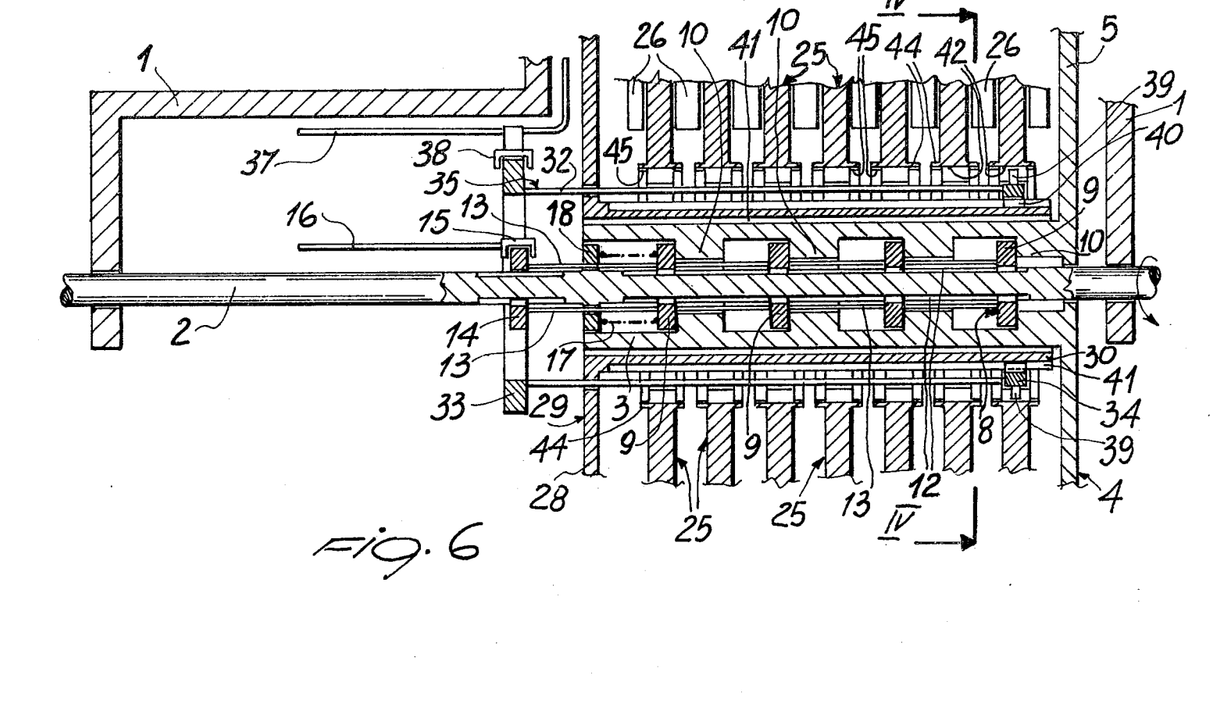
FIG. 6 shows an enlarged detail, in sectional form along the line VI—VI in FIG. 4, of the cage shaped coupling device and of the structural units that cooperate with it, belonging to the drive shown in FIGS. 4 and 5.
Figure 8:
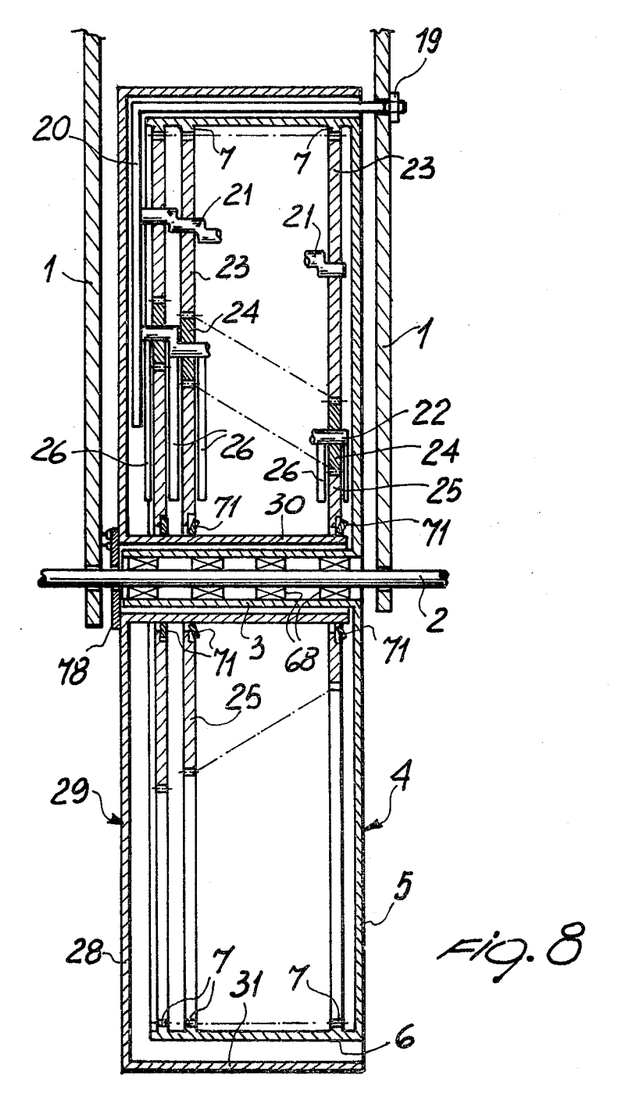
FIG. 8 shows in axial section a third form of embodiment for the variable ratio drive according to the invention.

As can be seen from the drawings, the speed changing device shown in FIGS. 4–7 differs essentially from that shown in FIGS. 1 and 2 (the reference numbers in which are repeated for corresponding parts in respect of which a further description is not given herein) because of the fact that the kinematic coupling between the drive shaft or the rotating drive unit 2 and the central tubular part 3 of the bell shaped drive member 4 is no longer realized through the unidirectional freewheel couplings 68 but, instead, through a disengageable friction clutch 8, the details of which are quite apparent in FIG. 6. The said friction clutch is constituted by a succession of friction material disks 9 that are friction coupled in a releasable fashion with the corresponding annular internal projections 10 (also made of friction material) on the tubular part 3. To be more precise, the disks 9 are locked for rotation on the drive shaft 2 by gripping devices that slide between the teeth 11 of the disks 9 and the longitudinal slots 12 in the drive shaft 2 (FIGS. 4 and 6) but are left free to slide along the axis of the said drive shaft 2. The said disks are rigidly connected to one another by the rods 13 that slide through the annular projections 10 on the tubular part 3 of the bell shaped member 4 and terminate at a head disk 14 loosely carried by the drive shaft 2. The said head disk engages in sliding fashion with a fork slide 15 (FIGS. 5 and 6), to which a suitable control 16 is fastened. One or more springs 17 reacting against a disk 18 rigidly locked on the drive shaft 2 push and maintain the disks 9 in releasable friction engagement with the annular projections 10 on the bell shaped member 4.

Another distinguishing characteristic of the speed changing device shown in FIGS. 4–7 is represented by the fact that, with the purpose of facilitating the insertion of the external teeth 39 of the cage shaped body 35 into the slots 42 in the gearwheel 25 to be engaged from time to time, each slot 42 in each of the gearwheels 25 has its rear edges (in the direction of rotation shown by the arrow "F" in FIG. 7) slightly bevelled. Furthermore, each wheel 25 is provided, on the two sides immediately above the said slots 42, with a coaxial annular border 44 which a suitable friction material facing 45 raises to the same height as the upper extremity—preferably rounded off—of the teeth 39. The said teeth 39 (which are, in turn, completely faced with friction material), when the coupling member 35 to which they belong is operated by the tension rod 37, establish friction contact with the border 44 of the wheel 25 where they have to mesh and this causes the relevant speeds of rotation to gradually get closer, thus making it possible for the said teeth 39 to be easily and rapidly inserted into the slots 42.

As shown in FIGS. 6 and 7, each annular border 44 projects laterally from its wheel 25 to an extent which is greater than the diameter of the teeth 39 (cylindrical, as can be seen in FIG. 7) and is away from the closest border of the adjacent wheel by an amount scarcely greater than the said diameter of the teeth 39, in such a way as to allow the coupling unit 35 to be made to idle but without uselessly increasing the overall dimensions and without creating an undesirable extension in the ratio changing operation.

The way in which the speed changing device shown in FIGS. 4–7 operates is as follows. Normally the friction clutch 8 is in the normal operating condition depicted in FIG. 6 whereby the drive shaft 2 is able to pass its own rotation onto the bell shaped member 4, which in turn through the idle wheels 23 and 24 maintains the various gearwheels 25 in rotation at different speeds, respectively. The gearwheel 25 (the first from the right in FIG. 6) that has the teeth 39 of the coupling device 35 inserted in its own slots 42 passes, in turn, the motion (through the said coupling device connected to the tubular part 30) onto the second bell shaped member 29 which carries in rotation the rotating driven unit (for example, the rear drive wheel of a motorcycle, or the drive wheels of a motor vehicle or the propeller shaft of a boat, etcetera).

To effect the change of ratio, it is first of all necessary to disengage the friction clutch 8 by operating the control 16 so as to move the disks 9 far away from the annular projections 10 and thus counteract the action of the springs 17. The bell shaped member 4 thus stays disengaged from the drive shaft 2 though continuing to be kinematically linked to the bell shaped member 29 and thus to the rotating driven unit which continues its rotation through inertia. The various wheels 25 thus adjust their respective speeds to correspond to the progressively decreasing speed of the rotating driven unit.

Through the control 37 it is then possible to proceed with the change of ratio and the cage shaped member 35 is displaced along its own axis in such a way as to easily and silently disengage the teeth 39 of the latter from the slots 42 in the wheel 25 which up until then were engaged therein and to cause them to progressively approach those of the adjacent wheel 25 to be engaged once the neutral position between one border 44 and another has been negotiated.

While all the wheels 25 continue to idly rotate through inertia, and thus at ever decreasing speeds, the teeth 39 of the coupling device 35 (carried in inertia rotation at the same speed as the driven member) come into contact with the facing 45 of the adjacent border 44 of the wheel 25 to be engaged (this is the situation shown in dots and dashes in FIG. 7). The friction contact thus created causes the rotation speed of the wheel 25 to be engaged (which depending upon the ratio can be slightly higher or slightly lower) to approach progressively that of the teeth 39 of the coupling device 35 and thus after the said teeth have also been momentarily in friction contact with the lateral surface of the wheel 25 to be engaged (which is also faced on both sides with friction material below the borders 44), they can easily and silently be inserted in the corresponding slots 42, thereby exploiting both the minimum relevant velocity between the teeth and the slots and the rounded off profile of the teeth 39 and of the rear edges of the slots 42 (FIG. 7). Once the ratio changing operation is thus over, the friction clutch 8 can be returned to the position illustrated in FIG. 6, thereby restoring the full kinematic connection between the drive shaft 2 and the rotating driven unit.

The above applies when changing to a higher ratio or to a lower ratio or when changing direction.

In order to have one or more reverse ratios, all that has to be done is to have one or more wheels 23 that mesh with one or more additional wheels 25, in other words without the auxiliary of other wheels as, instead, occurs for forward speeds.

Insofar as mopeds and motorcycles are concerned, it should be noted that in general it can be useful not to dispense with the drive chain, as could, instead, be done with the present drive system. In other words, it could be preferable to keep the drive member and the drive shaft non-coaxial, and to connect the latter, via a chain, to a subsidiary shaft coaxial to the former and connected thereto through the previously described disengageable friction clutch.

The variable ratio drive shown in FIG. 8–11 differs, in turn, from that shown in FIG. 1 and FIG. 2 (the reference numbers in which are repeated for corresponding parts in respect of which a further description is not given herein) as regards the means used to selectively couple the driven member 29 to one or the other of the gearwheels 25 gripping to the drive member 4.

Figure 9:
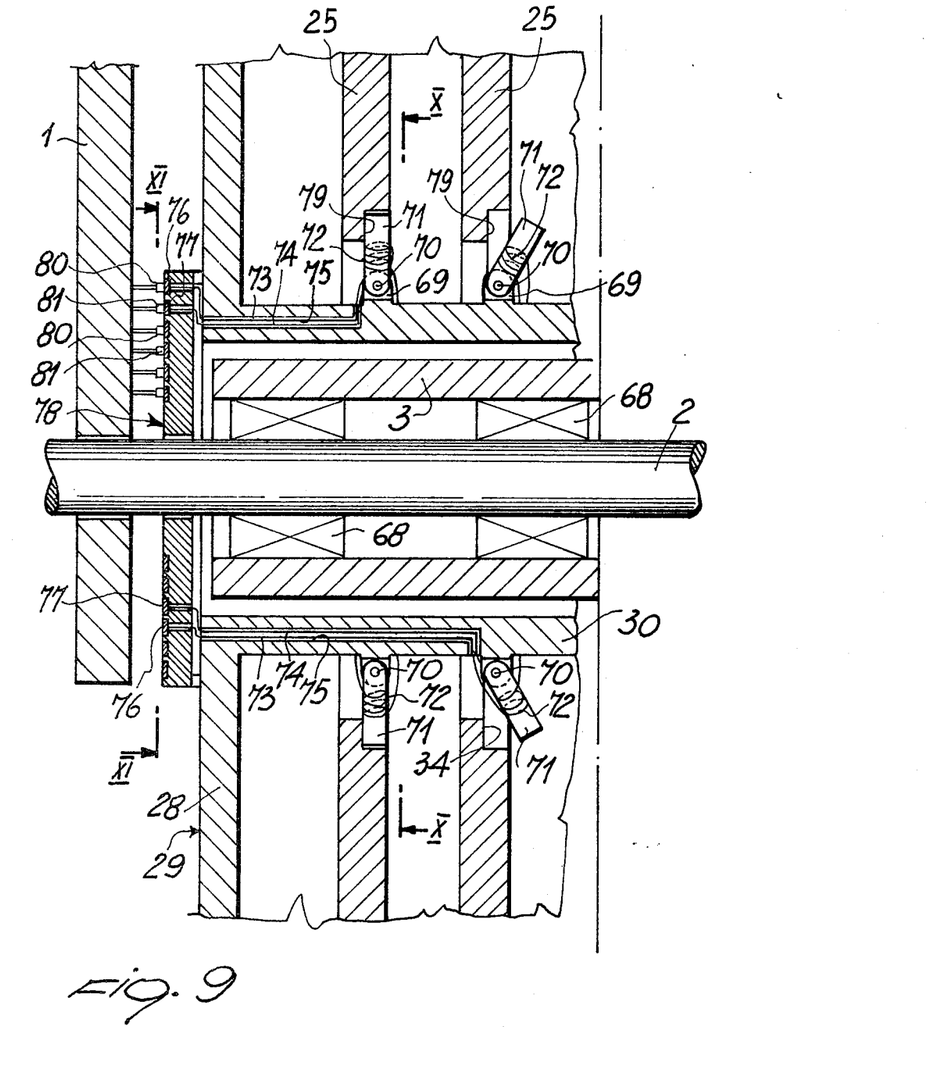
FIG. 9 shows again in axial section, but on an enlarged scale, the detail of the selective coupling means with which the change of ratios in the drive depicted in FIG. 8 is made possible.
Figure 10:
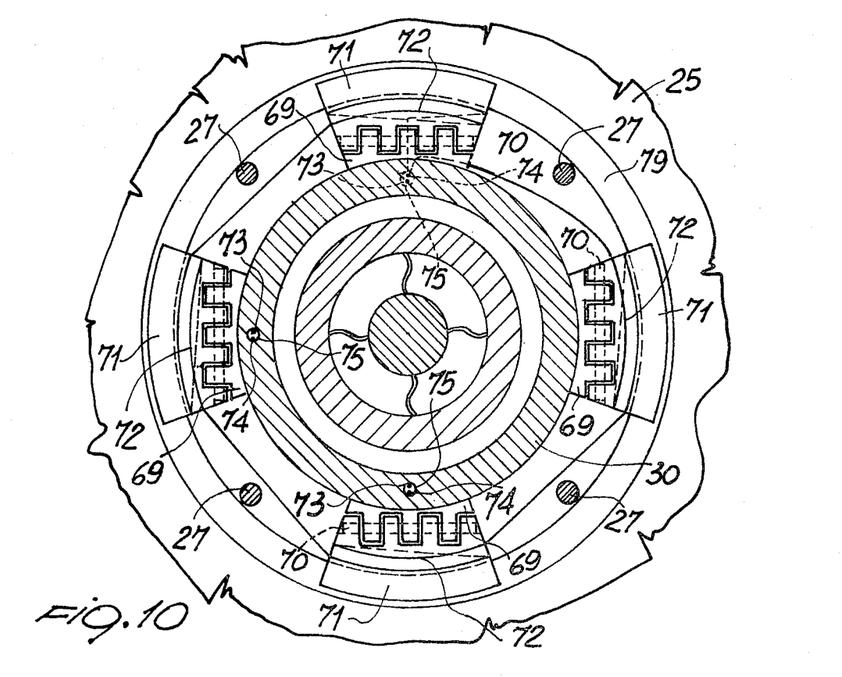
FIG. 10 shows the said coupling means in cross section along the line X—X in FIG. 9.

As more clearly shown in FIGS. 9 and 10, a number of external annular projections 69 on the central tubular part 30 of the driven member 29 have pivoted to them at 70 corresponding circumferential successions of circular segments 71, which springs not shown in the drawings (connected, for example, to the extremities of the pins 70) maintain normally in the supposed non-operative position for the succession on the right in FIG. 9. From the said non-operative position, the said successions of circular segments can be selectively displaced, as will be explained more clearly later on, into the supposed operative position for the succession on the left in FIG. 9 where the circular segments 71, suitably shaped or faced with friction material, are forced to friction engage with a hollow annular part 79 in the corresponding gearwheel 25 in order to form a single body with the said wheel and to thus pass the rotary motion of the said wheel onto the driven member 29 and thus to the rotating driven unit fixed thereto.

For the displacement of the successions of circular segments or coupling members 71 from the non-operative to the operative position (that is to say, to the "engagement" position) use is made of the magnetic field which suitable coils 72 interconnected to one another (FIG. 10) and to a pair of electrical conductors 73 and 74 that pass through a corresponding longitudinal hole 75 in the tubular part 30 of the driven member 29 (FIG. 9) are—with selective control—able to create, and for this purpose the circular segments 71 could be totally or partly made of magnetic material (they could be in one piece and made of a material having both magnetic and friction characteristics, or they could have an inside core of magnetic material and be faced with friction material). The said magnetic field causes, in fact, reciprocal attraction between the circular segments 71 of the chosen succession and the corresponding gearwheel 25 (obviously made of metal), the force of which is calculated in such a way as to overcome the resistance of the counter springs.

Figure 11:
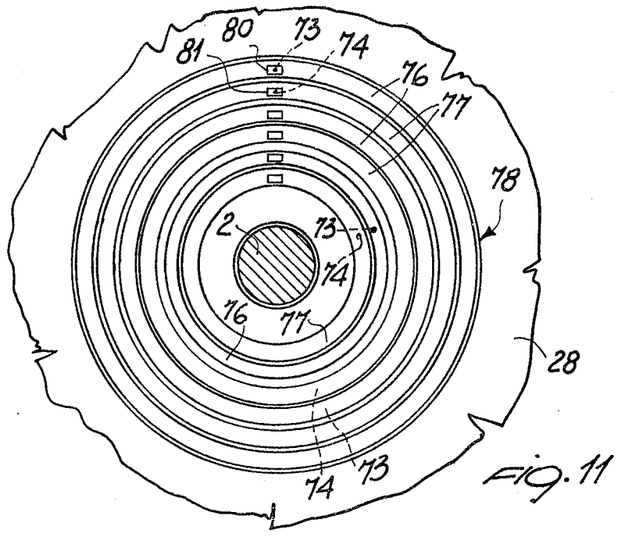
FIG. 11 shows in turn a cross sectional view along the line XI—XI in FIG. 9.

Each pair of electrical conductors 73 and 74 terminating at a given group of control coils 72 for given successions of circular segments 71, ends at a given pair of circular conductor paths 76 and 77 placed concentrically on a disk 78 rigidly fixed to the base part 28 of the driven member 29 (FIGS. 9 and 11). The disk 78 will obviously be provided with the same number of pairs of conductor paths 76 and 77 as there are successions of circular segments 71, even though in FIG. 11 only three of the said pairs have been shown so as to keep the drawing simple and clear.

Along the said conductor paths 76 and 77 slide the brushes 80 and 81, respectively, and these are supported by the fixed structure 1 and are electrically connected to an apparatus or to an electrical control board (not shown in the drawings) so as to allow, through the said brushes and the said conductors, the selective excitation of any one group of coils 72 connected in series.

The way in which the drive shown in FIGS. 8-11 operates is as follows. Through the freewheels 68 (or eventual rigid coupling members) the rotation of the shaft 2 is passed onto the drive member 4 and this, through the idle wheels 23 and 24, maintains the various gearwheels 25 in rotation at different speeds, respectively. The gearwheel 25 (the first from the left in FIGS. 8 and 9) that from time to time friction engages with the respective succession of circular magnetic segments 71 (moved into the operative position by the excitation of the relevant coils 72 actuated through the particular circuit made up of the brush 80, the conductor path 76, the conductor wire 73, the coil 72, the conductor wire 74, the conductor path 77 and the brush 81), passes the motion onto the driven member 29 and thus to the rotating driven unit (for example, the rear drive wheel of a motorcycle, the shaft of a motor vehicle, propeller or frame etcetera).

To change the ratio (which has the further advantage of making a temporary interruption in the supply not necessary), it is sufficient just to perform an operation at the electrical control board through which current to the group of coils 72 is cut off (up until then it had been supplied thereto) and is given, instead, to the group corresponding to the new ratio desired. This can be done, for example, by merely pressing a pushbutton on the control board. The magnetic segments 71 that operate in conjunction with the de-energized coils then move readily, silently and unhesitatingly to the nonoperative position, whilst those that operate in conjunction with the excited coils move towards the particular wheel 25 in order to enter into the required friction engagement with it. The driven member 29 is thus called upon to rotate at the speed corresponding to the fresh wheel 25 engaged.

Because of the extreme ease and rapidity of the change of ratios it is advisable that the control pushbuttons provided on the control board (unequivocally recognizable one from the other just by the touch, or better still because of the special and different way in which they are located) offer a certain resistance against switching themselves on or off and that they be housed in a position such as to render their inadvertent operation difficult, specially by those not authorized to touch them.

Neutral will be engaged when no control is switched on or when a special control to obtain this has been operated.

It is clear, however, that the electrical control board can be provided with different devices and, especially in motor vehicles, that it may be preferable to have a single control lever with various positions corresponding to the divers pushbuttons mentioned above.

Naturally what has been shown in the drawings only covers a few of the many possible forms of embodiment for the present invention. Various modifications can, therefore, be introduced thereto without any deviation from the framework of the invention as outlined in the claims below. One such modification can, for example, consist in winding the coils 72 of the speed changing device shown in FIGS. 8-11 around magnets integral with the tubular part 30 of the driven member and in having the said magnets operate the operative displacement of the circular segments 71 which in this case would act solely as coupling members that are made to grip the gearwheels 25.

Another modification can consist in leaving the shaft 2 outside the bell shaped drive member 4 and in connecting it, either directly or indirectly, to the base 5 of the drive member 4, or else—through a suitable gear—to the cylindrical face 6 of the said drive member 4 and thus not in a way coaxial thereto.

Other modifications can easily spring to the mind of a person experienced in this particular technical field, this also depending upon the type of application envisaged for the speed changing device described herein.

In motor vehicles of single engine type it is possible, in particular, to use, with the auxiliary of tapered joints and axle shafts, one single drive according to the present system, variable for two or more drive wheels; just as it is also possible to use, instead, one of the said drives per drive wheel.

When it is wished to reduce overall dimensions vertically (for example, in racing cars), it is possible to take the bar 22, and therefore the serving wheels 24, out of the alignment established by the bar 21 and the shaft 2. In this way the said wheels 24 are carried to the right or to the left of the said alignment and it becomes possible for the wheels 23 to be made to approach, almost touching them, the wheels 25, thereby reducing the vertical dimensions considerably.

It should be noted, however, that in view of the very small volume in width or thickness occupied by the present device, it may be advisable—again to greatly cut down its vertical dimensions—to use the drive laying on its back, through the use of suitable means for passing the motion on.

In such a case it will be preferable to substitute the straight positioning guides 26 with circular guides fitted to the periphery of the wheels 24 or 23; and, furthermore, to provide the support spindles 27 (see FIGS. 1-4-10) with lowerable radial teeth (so as to allow the insertion of the wheels 25), held in position by springs provided for this purpose. In this way, the wheel 25 will be kept in perfect alignment by peripheric and central guides.

Instead of their pivoting around their own axes, the spindles 27 will have—again with a view to reducing friction—washers free to rotate, these being at points corresponding to the wheels 25 and of an outside diameter obviously greater than the slots 42 machined into the internal cylindrical surface 43 of the wheels 25 of the mechanically operated drive. The said slots are missing in the electromagnetically operated device but the spindles 27 can still have the said radial teeth, the guides and the said sliding washers.

Another system for efficiently substituting the positioning guides 26 could be to cause the upper parts to scrape lightly against one another (in order to allow the lower free passage of the radial teeth 39 of the cage shaped member 35) of the annular borders 44 (FIGS. 4, 5, 6 and 7); the said borders could also be advantageously fitted to the electromagnetically controlled device.

Finally, it should be recalled that in the majority of cases the speed reduction function is required and, therefore, the motion is transmitted from the centre (where coaxial conditions exist) to the periphery. Therefore there is no tubular member 30 and the internal radial teeth 40 of the cage shaped member 35 slide axially along slots machined into the tubular member 3 of the drive member which thus passes its rotary motion onto the wheel 25 engaged and from this, via the relevant kinematic chain, onto the corresponding internal gear 7 which is now a part of the driven member and no longer of the drive member.

Naturally the base parts 5 and 28 can also be left out, whilst in the electromagnetically operated device, the spindles 27 are superfluous. In the electromagnetically operated version, the complete electrical equipment, fixed and loose, which for the multiplicative function acted in conjunction with the member 30, acts directly in conjunction with the member 3 for the reduction function, since the former member is missing. The kinematic motion takes place as outlined earlier on.

What is claimed is:

1. A variable ratio drive for gearing rotating parts to one another, essential features of which are that it comprises:
    a bell shaped drive member with internal cogging, carried in axial rotation by the rotating drive unit; a plurality of kinematic gear chains engaging with the teeth in the inside of the said drive member, placed parallel to one another transversely to the axis of rotation of the said drive member in such a way as to convert the rotary motion of the latter into variable ratio motion at various speeds of the corresponding gearwheels arranged coaxially to the inside of the said drive member; a driven member able to rotate around the axes of said gearwheels and said drive member, and enabled to be coupled for rotation to a rotating driven unit; and suitable means for selectively coupling the said gearwheels to suit the desired gear ratio.

2. A drive according to claim 1, wherein the said selective coupling means are constituted by a cage shaped coupling body placed coaxially to the inside of the said gearwheels and in rotating engagement with the said driven member, and axially displaceable with respect thereto in order to selectively engage with an external ring of teeth in a corresponding internal ring of slots in one or the other of the said gearwheels, passing through a neutral position.

3. A drive according to claim 1, wherein the said rotating drive unit is constituted by a shaft that passes axially through a central tubular part of the said bell shaped drive member and is kinematically connected thereto by means of unidirectional freewheel coupling members.

4. A variable ratio drive wherein the said drive member is coupled to the said drive unit through a disengageable friction clutch and each gearwheel has its internal ring of slots laterally provided with at least one coaxial annular border of friction material with which the said external ring of teeth of the cage shaped coupling device is destined to establish friction contact prior to engaging, at the time the change of ratio is made, with the slots in the gearwheel.

5. A drive according to claim 4, wherein the said rotating drive unit is constituted by a shaft that passes axially through a central tubular part of the said bell shaped drive member, and the said friction clutch comprises a plurality of friction material disks loosely mounted on the said shaft and elastically thrust into friction engagement with corresponding internal projections in the said central tubular part of the drive member, special actuating means being provided to cause the said disks from temporarily moving out of their friction engagement with the said projections.

6. A drive according to claim 1, wherein the said driven member is in turn in the form of a bell opposite that of the said drive member, is free to pivot around it and has a central tubular part arranged loosely around the said tubular part of the drive member, passing inside the said gearwheels, the said driven member having a base part to which circumferentially spaced spindles rotatably supporting the said gearwheels are fixed.

7. A drive according to any one of the preceding claims, wherein the said cage shaped coupling device is formed by: an external ring coupled to operating means; an internal ring, mounted to slide along the said central tubular part of the drive member, and provided with the said external ring of teeth and with a further internal ring of teeth in constant rotation engagement with corresponding radial notches that extend longitudinally along the said central tubular part of the drive member; and circumferentially spaced parallel second spindles for connecting the said rings, the said second spindles being intercalated with the said first spindles supporting the said gearwheels.

8. A drive according to claim 1, wherein the said selective coupling means comprise a plurality of circumferential successions of coupling members carried by the said driven member which can be made electromagnetically, in a selective way, to move between a non-operative position in which the relevant gearwheel is idling and an operative position in which they engage with the said gearwheel to pass the rotary motion of this onto the said driven member.

9. A drive according to claim 8, wherein the said coupling members are constituted by circular segments at least partially made of friction material which are friction engageable with the said gearwheels.

10. A drive according to claim 8, wherein the said successions of coupling members are arranged in an axially spaced way around a central tubular part of the said driven member which is made to pass, rotating, inside the said gearwheels, the said driven member being in turn in the form of a bell opposite that of the said drive member, free to pivot around it and having a base part to which circumferentially spaced parallel spindles are fixed, these extending axially to the outside of the said central tubular part of the driven member and rotatably supporting the said gearwheels.

11. A drive according to claim 8, wherein the said successions of coupling members are operated electromagnetically through corresponding series connected electrical coils installed in the region of the said coupling members and electrically connected via external operating means.

12. A drive according to claim 8, wherein the said rotating drive unit is constituted by a shaft rigidly connected to the said bell shaped drive member.

13. A variable ratio drive, essential features of which are that it comprises: a drive member carried in axial rotation by the rotating drive unit; a plurality of various gearwheels arranged coaxially around the said drive member; a plurality of parallel kinematic gear chains engaged with the internal coaxial teeth of the driven member, coaxial to the drive member, designed to convert the original rotary motion of the rotating drive unit into rotary motion at various respectively reduced speeds of the said internal coaxial teeth of the driven member, the latter being coupled for rotation to the rotating driven unit; and means that can be operated to selectively couple the said driven member to one or the other of the said gearwheels to suit the desired gear ratio.

* * * * *